(12) United States Patent
Barioz

(10) Patent No.: US 6,703,435 B2
(45) Date of Patent: Mar. 9, 2004

(54) METHOD OF PRODUCING A COMPOSITION BASED ON A POLYMER CROSSLINKED USING A SILANE, A COMPOSITION OBTAINED BY SAID METHOD, AND A METHOD OF PRODUCING A CABLE PROVIDED WITH A SHEATH OF SAID COMPOSITION

(75) Inventor: Chantal Barioz, Lyons (FR)

(73) Assignee: Nexans, Paris (FR)

( * ) Notice: Subject to any disclaimer, the term of this patent is extended or adjusted under 35 U.S.C. 154(b) by 0 days.

(21) Appl. No.: 10/105,247

(22) Filed: Mar. 26, 2002

(65) Prior Publication Data

US 2002/0143114 A1 Oct. 3, 2002

(30) Foreign Application Priority Data

Mar. 27, 2001 (FR) .............................................. 01 04541

(51) Int. Cl.$^7$ ................................................. C08K 5/24
(52) U.S. Cl. ....................... 524/269; 524/436
(58) Field of Search .................. 524/269, 436

(56) References Cited

U.S. PATENT DOCUMENTS 6,107,413 A    8/2000  Mori

FOREIGN PATENT DOCUMENTS

| EP | 0 281 268 A2 | 9/1988 |
|---|---|---|
| EP | 0 365 289 A2 | 4/1990 |
| EP | 0 426 073 A2 | 5/1991 |

OTHER PUBLICATIONS

Database WPI, Section CH, Week 197931 Derwent Publications, Ltd., London, GB, AN 1979–56756B XP002182445 corresponding to JP 54 076647 A (Hitachi cable Ltd) dated Jun. 19, 1979.

*Primary Examiner*—Bernard Lipman
(74) *Attorney, Agent, or Firm*—Sughrue Mion, PLLC

(57) ABSTRACT

The present invention concerns a method of producing a composition based on a polymer crosslinked using a silane, the method comprising the following operations:

a) mixing:
   i) a thermoplastic base polymer or a mixture of thermoplastic base polymers containing a flame retarding filler;
   ii) a carrier polymer for a silane-based crosslinking agent, the carrier polymer being solid and selected from porous sponge type polymers, swellable polymers, and encapsulates, which carrier polymer is soluble or dispersible in the base polymer and does not react with the silane; and
   iii) a free radical generator;
b) heating the mixture; and
c) exposing the mixture to a sufficient quantity of water to allow the base polymer to crosslink; and, during the heating operation, the mixture is heated to a temperature to cause the free radical generator to decompose without decomposing the filler, the free radical generator being selected so that its absolute decomposition temperature is less than 165° C., and the crosslinking operation is carried out in an ambient atmosphere.

6 Claims, No Drawings

METHOD OF PRODUCING A COMPOSITION BASED ON A POLYMER CROSSLINKED USING A SILANE, A COMPOSITION OBTAINED BY SAID METHOD, AND A METHOD OF PRODUCING A CABLE PROVIDED WITH A SHEATH OF SAID COMPOSITION

The present invention relates to a method of producing a composition based on a polymer crosslinked using a silane, to a composition obtained by said method, and to a method of producing a cable provided with a sheath produced from said composition.

BACKGROUND OF THE INVENTION

Polymers crosslinked using a silane are well known, and used to insulate power cables. They have the advantage of possessing particularly advantageous mechanical and electrical insulation properties; crosslinking enhancing the mechanical properties of the composition.

It is known that the physical properties of polymers can be modified by crosslinking the polymer chains. Crosslinking using a silane, and more generally crosslinking using one or more unsaturated olefinic alkoxysilanes as a crosslinking agent, is a process that is widely used to crosslink polymers. A number of known methods exist for crosslinking using silanes.

One known method of crosslinking polymers using silanes has been described in European patent EP-A-0 426 073. It consists of mixing:

a base polymer, in particular a thermoplastic polymer, for example a polyolefin such as polyethylene;

a carrier polymer for the silane crosslinking agent, which is compatible with the base polymer, i.e., soluble or dispersible therein; which carrier polymer is a porous polymer that absorbs or encapsulates the silane (generally a liquid) without reacting with it;

a free radical generator such as a peroxide, which serves to initiate the crosslinking reaction.

Mixing is carried out in an extruder, for example, in particular a screw extruder.

Crosslinking is then initiated in the presence of water.

The mixture can be extruded onto a cable.

It is important for the insulation on power cables to provide very good fire resistance. To this end, in known manner, additives known as flame retarding agents can be added to the polymers to improve their flame resistance. The above-described document mentions that such additives can be incorporated into the carrier polymer.

However, such a solution is not satisfactory since the silane is absorbed by the flame retarding agents, in particular when they are minerals. The silane functions intended to accomplish crosslinking are then consumed and hence neutralized by the reaction between the silane and the flame retarding agent.

A further known solution for producing crosslinked polymers using a silane with good fire resistance consists in incorporating the flame retarding additive in the base polymer; the base polymer is then said to be filled. Polyone sells a base polymer containing alumina trihydrate as a flame retarding filler, and intended for use in the preparation of a silane crosslinked polymer using the method described above.

A major disadvantage of that base polymer resides in the fact that crosslinking must be carried out in a moist medium, more precisely in an atmosphere that is saturated with water vapor, or by adding water to the mixture, rendering the production method very complex and expensive.

A further major disadvantage of that polymer resides in the fact that the flame retarding filler decomposes during extrusion. Flame retarding fillers have the property of decomposing above a certain temperature in order to act as a flame retarding agent.

Premature decomposition of the filler during production thus renders it ineffective when the material is in service.

Further, such decomposition results in the presence of water in the finished material, which deleteriously affects the desired mechanical characteristics and electrical insulating properties.

OBJECTS AND SUMMARY OF THE INVENTION

Thus, the aim of the invention is to develop a method of producing a composition based on a polymer crosslinked using a silane, providing good flame resistance, and in which crosslinking can be carried out in ambient air.

To this end, the present invention provides a method of producing a composition based on a polymer crosslinked using a silane, the method comprising the following operations:

a) mixing:
  i) a thermoplastic base polymer or a mixture of thermoplastic base polymers containing a flame retarding filler;
  ii) a carrier polymer for a silane-based crosslinking agent, said carrier polymer being solid and selected from porous sponge type polymers, swellable polymers, and encapsulates, which carrier polymer is soluble or dispersible in said base polymer and does not react with the silane; and
  iii) a free radical generator;

b) heating said mixture; and c) exposing said mixture to a sufficient quantity of water to allow said base polymer to crosslink;

wherein, during the heating operation, said mixture is heated to a temperature to cause said free radical generator to decompose without decomposing said filler, said free radical generator being selected so that its absolute decomposition temperature is less than 165° C., and wherein said crosslinking operation is carried out in an ambient atmosphere.

In accordance with the invention, extrusion takes place by heating to a temperature sufficient to cause the the free radical generator to decompose, but insufficient to cause the filler to decompose, which would deteriorate the electrical and mechanical properties of the composition obtained. Decomposition of the free radical generator, which is required for carrying out the crosslinking phase, takes place without causing decomposition of the filler.

The temperatures measured during decomposition extrusion of the flame retarding agent and free radical generator are lower than their absolute decomposition temperatures, as would be measured outside the composition to be crosslinked. During extrusion, the actual temperature reached by the material comprising the filler and free radical generator on the molecular level is higher than that recorded by measuring the temperature, principally due to self-heating of the material, internal shear, etc. . . .

The method of the invention, and in particular the choice of a free radical generator with an absolute decomposition temperature of less than 165° C., i.e., relatively low, means that it is also possible to avoid the crosslinking step brought about by adding a large quantity of water (atmosphere saturated with water vapor or direct addition of water), so that the moisture in the ambient atmosphere is sufficient to accomplish crosslinking of the base polymer.

In accordance with the invention, the filler contained in the base polymer is alumina trihydrate. Such a filler has a relatively low absolute decomposition onset temperature, of the order of 180° C. Its use is rendered possible by the fact that the free radical generator used has a decomposition temperature that is lower than that used in the prior art. Alumina trihydrate has the advantage of endowing the polymer into which it is incorporated with fire resistance properties that are comparable with those of magnesium oxide $Mg(OH)_2$, while being less expensive.

In accordance with an advantageous characteristic of the invention, prior to mixing, a polymer grafted with maleic anhydride is added to the carrier polymer. Since the carboxylic acid groups react with the filler, using this polymer prevents the silane-based crosslinking agent from reacting with the filler instead of grafting principally to the base polymer. Maleic anhydride also acts as a compatibilizing agent.

Further, operations a), b) and c) can be carried out simultaneously or one after the other.

The invention also provides a method of producing a cable comprising a sheath produced from a composition of the invention, this method comprising an extrusion operation prior to crosslinking.

The cable produced can be a telecommunications cable or a power cable.

DETAILED DESCRIPTION OF THE INVENTION

Further characteristics and advantages of the present invention will become apparent on reading the following description of an implementation of the invention, given purely by way of non-limiting illustration.

Base Polymer

The base polymer is the polymer to be crosslinked. It is a thermoplastic polymer or a mixture of such polymers. The base polymer can in particular be selected from polyolefins such as polyethylene (LLDPE, LDPE, HDPE) or a copolymer of ethylene and a further monomer, a copolymer of ethylene and vinyl acetate, EVA, etc. . . . In general, the base polymer is a solid, for example in granular form.

Flame Retarding Filler

The flame retarding filler added to the base polymer is preferably a mineral filler. Mineral flame retarding fillers that are known to the skilled person include magnesium oxide $Mg(OH)_2$, talc, zinc borate, mica, silica, and alumina trihydrate. Alumina trihydrate has the advantage of being particularly low in cost. It has an absolute decomposition onset temperature of the order of 180° C.

Carrier Polymer

The carrier polymer is in solid form, constituted by particles, for example, and must be compatible with the base polymer and the silane-based crosslinking agent. It must be capable of incorporating the crosslinking agent (usually a liquid) while preserving its solid and granular form. Porous polymers that are known for this type of use, in particular those described in EP-A-0 426 073, include porous polymers that can incorporate the silane-based crosslinking agent into their pores, or swellable polymers that swell in the presence of a silane, or encapsulating agents, in which the silane is contained in capsules constituted by porous polymers.

More generally, all the porous polymers described in the above-mentioned document can be used to carry out the present invention. In particular, it can be porous polyethylene, expanded or crazed, or porous EVA, expanded or crazed.

Silane-Based Crosslinking Agent

These are silanes that can be grafted onto and crosslinked with the base polymer or polymers described above. It can be vinyltriethoxysilane, for example.

Free Radical Generator

This serves to liberate free radical sites in the base polymer. It is generally an organic peroxide.

In accordance with the invention, a free radical generator is used which has an absolute decomposition temperature of less than 165° C. An example of a free radical generator with such a property is trimethyl cyclohexane butyl peroxide.

Hydrolysis Catalyst

To accelerate the crosslinking reaction at ambient atmosphere, a hydrolysis catalyst can be incorporated into the mixture of the invention, for example a tin salt such as dibutyltin dilaurate.

Other Additives

Additives that are routinely used and well known to the skilled person for crosslinking can be used in the context of the present invention. In particular, they include antioxidants, stabilizers, etc. . . .

Maleic Anhydride Grafted Polymer

In accordance with the invention, a further polymer grafted with maleic anhydride is incorporated into the base polymer. In accordance with the invention, maleic anhydride can prevent the silane from grafting to the flame retarding agent during the crosslinking reaction rather than to the base polymer. Further, maleic anhydride acts as a compatibilizing agent between the flame retarding filler and the base polymer.

The polymer of this maleic anhydride grafted polymer can, for example, be polyethylene, a terpolymer (ethylene butyl acetate EBA, ethylene methyl acetate EMA), propyl ethylene, or EVA.

An example is given below of a composition used in carrying out the method of the invention, and of the corresponding method.

Preparation of Base Polymer

Compound A was prepared by continuously hot mixing the following (temperature about 130° C.):

90 parts polyethylene;

10 parts polyethylene grafted with maleic anhydride;

110 parts alumina trihydrate;

2 to 3 parts protective agents (antioxidants, anti-UV, etc.).

Resulting compound A was homogeneous.

Preparation of Carrier Polymer

A mixture B was prepared by impregnating 50 parts of porous polyethylene with a liquid mixture comprising:

89.8 parts of a silane-based crosslinking agent, vinyltriethoxysilane;

7.7 parts of a peroxide, 1,1-bis(tertbutylperoxy)-3,3,5-trimethylcyclohexane, with an absolute decomposition temperature of 128° C.;

2.5 parts of a tin salt as a catalyst.

Preparation of Composition

Heating and mixing was carried out simultaneously, in an extruder for example, of 100 parts of compound A with 5 to 6 parts of mixture B, at a temperature of less than 165° C., preferably in the range 135° C. to 155° C. This operation was carried out in an ambient atmosphere, i.e., without adding water in the form of vapor or liquid.

This caused a "self-crosslinking" crosslinking reaction, and a crosslinked polymer was obtained.

When producing a cable, either a telecommunications or power cable, having a sheath (external mechanical protection, electrical or other insulation) produced from a composition of the invention, the composition is extruded onto the cable prior to crosslinking.

The invention is particularly advantageous in that, by dint of a suitable choice of free radical generator and of flame retarding filler, it allows a filled polymer containing this flame retarding filler to be crosslinked in an ambient medium.

In contrast to the prior art method, in which the temperature of the mixture of base polymer filled with the carrier polymer for the silane is high so that the crosslinking reaction that subsequently occurs must be carried out in the presence of a large quantity of water, the feature of the present invention of selecting a free radical generator with a fairly low decomposition temperature renders possible the subsequent self-crosslinking of the filled polymer.

What is claimed is:

1. A method of producing a composition based on a polymer crosslinked using a silane, the method comprising the following operations:
   a) mixing:
      i) a thermoplastic base polymer or a mixture of thermoplastic base polymers containing a flame retarding filler;
      ii) a carrier polymer for a silane-based crosslinking agent, said carrier polymer being solid and selected from porous sponge type polymers, swellable polymers, and encapsulates, which carrier polymer is soluble or dispersible in said base polymer and does not react with the silane; and
      iii) a free radical generator;
   b) heating said mixture; and
   c) exposing said mixture to a sufficient quantity of water to allow said base polymer to crosslink;
wherein, during the heating operation, said mixture is heated to a temperature to cause said free radical generator to decompose without decomposing said filler, said free radical generator being selected so that its absolute decomposition temperature is less than 165° C., and wherein said crosslinking operation is carried out in an ambient atmosphere.

2. A method according to claim 1, wherein said flame retarding filler is alumina trihydrate.

3. A method according to claim 1, wherein prior to mixing, a polymer grafted with maleic anhydride is added to said carrier polymer.

4. A method according to claim 1, wherein operations a), b) and c) are carried out either simultaneously or one after the other.

5. A composition based on a polymer that can be crosslinked using a silane, the composition being obtained by a method according to claim 1.

6. A method of producing a cable comprising a sheath produced from a composition according to claim 4, the method comprising an extrusion operation prior to said crosslinking.

* * * * *